understand# United States Patent
Britt et al.

[15] 3,664,985

[45] May 23, 1972

[54] PREPARATION OF SILICON-FLUORIDE SILICONES

[72] Inventors: A. D. Britt, Falls Church, Va.; William B. Moniz, Clinton, Md.

[73] Assignee: The United States of America as represented by the Secretary of the Navy

[22] Filed: July 27, 1970

[21] Appl. No.: 58,737

[52] U.S. Cl...................260/46.5 R, 117/139.5 A, 117/142, 252/49.6, 260/46.5 H, 260/448.2 R, 260/448.2 E
[51] Int. Cl. ........................................................C08f 11/04
[58] Field of Search..................260/46.5 H, 46.5 R, 448.2 E, 260/448.2 R

[56] References Cited

UNITED STATES PATENTS 2,981,746   4/1961   Cohen et al.........................260/448.2
3,198,766   8/1965   Nitzsche et al. .....................260/46.5

FOREIGN PATENTS OR APPLICATIONS 627,800   8/1949   Great Britain.......................260/46.5

OTHER PUBLICATIONS

Britt et al., Hydride–Fluoride Conversions in Organosiloxane Chains, 3-Fluoroheptamethyltrisiloxane, Journal of the American Chemical Society, 91, 6204– 6205, October 22, 1969.

Simons, Fluorine Chemistry, Vol 1, pp. 32– 33, 1950, Academic Press, N.Y.

Primary Examiner—Donald E. Czaja
Assistant Examiner—M. I. Marquis
Attorney—R. S. Sciascia, Arthur L. Branning and James G. Murray

[57] ABSTRACT

A method is disclosed of selectively displacing hydride with fluoride at chain silicon positions in organopolysiloxane compounds. Also, 3-fluoroheptamethyltrisiloxane and the polymeric fluoro derivatives of liquid silicone hydrides are disclosed which have high thermal stability properties and are useful as high temperature-resistant release coatings.

3 Claims, No Drawings

PREPARATION OF SILICON-FLUORIDE SILICONES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to novel polyorganofluorosiloxanes and to methods of preparation thereof. More particularly, this invention relates to the production of silicon-fluoride bonded silicone compositions.

The commercially useful silicone fluids are usually linear polymers of the general formula $R_3SiO[R_2'SiO]_nSiR_3$ where R and R' are either hydrogen or hydrocarbon substituents and n refers to the number of recurring chain units. The partial replacement of hydrogen by fluorine in such structures is notable for its enhancement of thermal and oxidative stability, as well as improvement of other desirable properties such as hydrophobicity. Such materials are known as fluorinated silicones and, with very few exceptions, possess carbon-fluorine rather than silicone-fluorine bonds. Silicon-fluorine bonds occur at terminal positions in structures such as the disiloxanes, the silyl ethers, and the siloxy esters of boron.

Chain silicon-fluorine bonds are known in octafluorotrisiloxane ($F_3SiOSiF_2OSiF_3$) and in two trifunctional compounds, $(SiO_{1.5}F)_n$ and fluorotris(triphenylsiloxy)siloxane. The first compound is not a silicone and both trifunctional compounds are solids. For true silicone fluids, two patents disclose chain silicon-fluorine bonds, Brit. Pat. No. 627,800 and U.S. Pat. No. 2,981,746. Unlike the present invention which directly converts an extant silicone fluid into a chain silicon-fluorine silicone fluid, both patents employ the customary hydrolysis synthesis using non-silicone starting materials. Also, both the British and U.S. patents utilize an acid environment in which to carry out their synthesis. However, pmr observations and infrared measurements disclose that chain silicon-fluorine bonds in liquid silicones will be destroyed under even dilute HF or HCl acid environments. Under such conditions, the fluoride will migrate to carbon forming a C—F bond and leaving behind a Si—H bond. Consequently, the formulas assigned to the organofluorosiloxane polymers disclosed in the British and U.S. patents are in fact inaccurate.

SUMMARY OF THE INVENTION

In accordance with the present invention, there is provided the conversion of an extant silicone fluid possessing silicone hydride chain units into chain units of silicone-fluorine. The terminal chain groups and all other original structural features are unaffected. The synthesis, isolation and characterization of 3-fluoroheptamethyltrisiloxane is also disclosed.

STATEMENT OF THE OBJECT OF THE INVENTION

It is an object of this invention to provide novel polyorganofluorosiloxane fluids having silicon-fluorine linkages at one or more chain silicon positions.

It is a further object of this invention to provide a novel method for the preparation of polyorganofluorosiloxane fluids having silicon-fluorine linkages at one or more chain silicon positions.

A still further object of this invention is to provide a method for the preparation of polyorganofluorosiloxane fluids having silicon-fluorine linkages at one or more chain silicon positions that is selective, quantitative, and without appreciable side reactions.

Another object of this invention is to provide a method for the preparation of polyorganofluorosiloxane fluids having silicon-fluorine linkages at one or more chain silicon positions that utilizes existing silicone fluids.

It is an additional object of this invention to synthesize, isolate and characterize a linear organofluorosiloxane molecule bearing a (—RSiF) unit.

Still other objects, features and attendant advantages of the present invention will become apparent to those skilled in the art from a reading of the following detailed description of the preferred embodiments.

DESCRIPTION OF THE PREFERRED EMBODIMENTS

In this invention, polyorganosilicone fluids which may contain a single silicone hydride group or repeating chain silicone hydride groups and having the formula

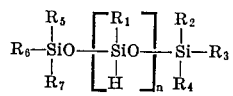

wherein $R_1$ to $R_7$ comprises an alkyl selected from the group consisting of methyl, ethyl, and propyl radicals and $n$ is an integer from 1 to approximately 40 are reacted with silver fluoride to produce a polyorganofluorosiloxane fluid containing one or more chain silicone fluoride groups and having the formula

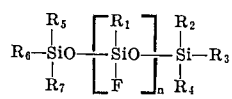

wherein $R_1$ to $R_7$ comprises an alkyl selected from the group consisting of methyl, ethyl, and propyl radicals and n is an integer from 1 to approximately 40. The $R_1$ to $R_7$ alkyl groups of the fluid are not affected or altered by the selective reaction with silver fluoride.

The reaction may be carried out with equimolar quantities of silicone hydride and silver fluoride, but a slight molar excess of the fluoride is usually desired to ensure high yields. When chain silicone hydride precursors are used, i.e. when $n$ is greater than one, it is difficult to isolate and specifically characterize the structure formed. Comparative NMR analyses show, however, that chain hydride substituents are converted to fluoride along the chain and that the remainder of the polymer remains the same.

One of the preferred silicone hydrides useful in this invention is methylhydrogenpolysiloxane. This commercially available hydride contains repeating units of the formula

and is readily available from various commercial sources.

A specific example of a preferred methylhydrogenpolysiloxane is DC 1107. Infrared spectrum analysis, refractive index, and elemental composition data indicate that DC 1107 has the following structure

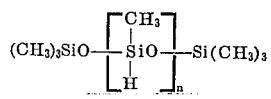

where n averages approximately 40. When DC 1107 is used as a silicone hydride precursor in the reaction with silver fluoride, a solid silicon-fluorine bonded silicone is formed which exhibits high thermal stability.

Silicone hydrides other than the DC 1107 methyl-hydrogen silicone can be used provided there is no steric hindrance to the fluorine conversion from chain hydrocarbon substituents such as aromatic groups, alkenes, cyclic groupings, or other nonlinear radicals. Also, halogenated silicone hydrides are not desirable precursors due to the evolution of acidic compounds wherein it has been established that the chain silicon-fluorine bond cannot exist.

A major area of application of the polymers and blends of this invention is that of low surface energy coatings (which provide release surfaces and oil- and water-repellent surfaces). Such coatings have utility as mold release coatings, coatings for condensing surfaces (to produce efficient heat transfer by dropwise condensation), textile and leather coatings, antifouling coatings, and bearing surfaces.

The present invention may be more specifically described with the following illustrative examples.

EXAMPLE I

Dissolve one gram of 3-hydrido-heptamethyltrisiloxane in 5 ml acetone. Add one gram silver fluoride in small increments of a few milligrams at a time over a period of 3 to 4 hours at 25° C. A vigorous reaction occurs at the solid silver fluoride-liquid interface. The reaction product had the following formula

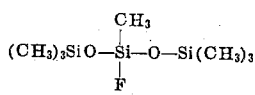

as determined by proton NMR analysis and the yield exceeded 90 percent.

EXAMPLE II

Wash 1.5 grams silver fluoride with 5-10 ml portions of acetone until the wash liquid tests neutral to litmus. Store the washed silver fluoride under benzene and use within 24 hours. Dissolve one ml of 3-hydrido-heptamethyltrisiloxane in a 10 ml solution of 50 percent benzene and 50 percent acetone. Add the purified silver fluoride, a few milligrams at a time, until substantially no more hydrogen gas is evolved; this normally takes 3-4 hours at ambient conditions. The reaction mixture may be agitated to facilitate escape of $H_2$ gas, however, too vigorous of a reaction or warming of the mixture is to be avoided due to the volatility of the 3-hydride precursor. After the reaction is completed, the mixture is centrifuged, filtered and then purified by gas-liquid chromatography. The product was 3-fluoroheptamethyltrisiloxane in yields above 95 percent. It was a colorless volatile liquid having a boiling point of 148° C. at 754.5 mm Hg. Refractive index was 1.3704 measured at 25° C. Elemental analysis gave:

| | Found* | Calculated |
|---|---|---|
| carbon | 32.50% | 34.96% |
| hydrogen | 8.47% | 8.80% |
| fluorine | 7.81% | 7.90% |

*The volatility of the product affected the C—H analysis but not the F analysis which was in sealed gelation capsules.

The pmr spectrum of the product in benzene consisted of the terminal methyl singlet at 7.08 ppm and the 3-methyl doublet centered at 7.12 ppm with $J_{F\text{-}CH_3}$ equaling 4 Hz. The fluorine magnetic resonance spectrum showed only the expected quartet, centered 9.8 ppm downfield from the $CH_3SiF_3$ quartet, with a splitting of 4 Hz. Mass spectra, infrared and Raman spectral analysis were obtained for the 3-hydride precursor and the 3-fluoride product. Comparison of spectral lines indicate the conversion of the hydride to a fluoride.

EXAMPLE III

Dissolve 1.6 gm DC 1107 in a 10 ml solution of 50 percent benzene and 50 percent acetone. Use the same procedure and conditions delineated in example II to obtain the fluorinated derivative product. NMR analysis showed retention of the main features of DC 1107 but with a hydride decrease and a new shoulder on the downfield side of the chain —$CH_3$ resonance doublet, indicating formation of a [$CH_3$—Si—F] moiety. The product was a clear silicon-fluorine bonded silicone which, in thermal stability tests, was infusible at 400° C.

Obviously many modifications and variations of the present invention are possible in light of the above teachings. It is therefore to be understood that within the scope of the appended claims the invention may be practiced otherwise than as specifically described.

What is claimed and desired to be secured by letters patent of the U.S. is:

1. A process for preparing a silicon-fluoride bonded silicone composition comprising reacting equimolar quantities of silver fluoride and a silicone hydride having the formula

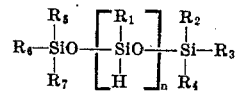

where $R_1$ to $R_7$ are alkyls selected from the group consisting of methyl, ethyl, and propyl radicals and $n$ is an integer from 1 to approximately 40.

2. The process of claim 1 wherein a slight molar access of silver fluoride is used.

3. The process of claim 1 wherein the reaction is continued until substantially no hydrogen gas is evolved.

* * * * *